No. 647,831. Patented Apr. 17, 1900.
L. E. HALE.
BRAKE SHOE.
(Application filed Sept. 22, 1899.)

(No Model.) 2 Sheets—Sheet 1.

No. 647,831. Patented Apr. 17, 1900.
L. E. HALE.
BRAKE SHOE.
(Application filed Sept. 22, 1899.)

(No Model.) 2 Sheets—Sheet 2.

Witnesses:

Inventor
Lorin E. Hale,
By Edson Bro's,
Att'ys.

THE NORRIS PETERS CO., PHOTO-LITHO., WASHINGTON, D. C.

UNITED STATES PATENT OFFICE.

LORIN E. HALE, OF KANSAS CITY, MISSOURI, ASSIGNOR OF ONE-HALF TO LOUIS ROBIDOUX, OF SAME PLACE.

BRAKE-SHOE.

SPECIFICATION forming part of Letters Patent No. 647,831, dated April 17, 1900.

Application filed September 22, 1899. Serial No. 731,331. (No model.)

*To all whom it may concern:*

Be it known that I, LORIN E. HALE, a citizen of the United States, residing at Kansas City, in the county of Jackson and State of Missouri, have invented certain new and useful Improvements in Brake-Shoes; and I do hereby declare the following to be a full, clear, and exact description of the invention, such as will enable others skilled in the art to which it appertains to make and use the same.

This invention relates to a new and useful improvement in brake-shoes for vehicles, &c., especially adapted for application to rubber and similar tires; and its object is to provide a brake-shoe which will reduce wear and tear upon the tire to the minimum without reducing its efficiency.

A stationary brake-shoe, such as used on a metal tire, would not be safe to apply to a rubber tire, besides increasing cost of repairs, owing to its tendency to tear or disarrange the same by the friction of the shoe. To overcome these objections I have provided a rotary brake-shoe capable of revolving in exact unity with the moving tire when applied thereto, thereby causing no wear thereupon, while at the same time sufficient friction may be generated within the shoe to stop the motion of the wheel whenever desired.

To these ends the invention consists in the novel construction and combination of parts hereinafter more fully described and claimed, and illustrated in the accompanying drawings, showing the preferred form of my invention, and in which—

Figure 1:
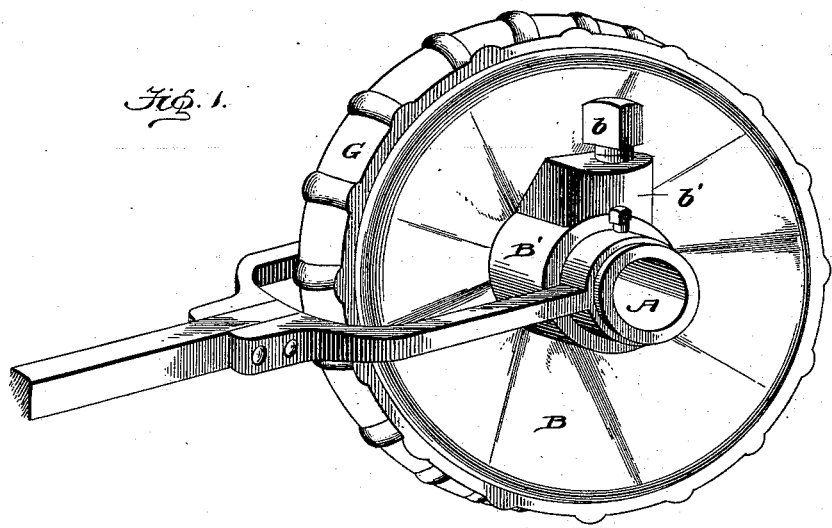
Figure 2:
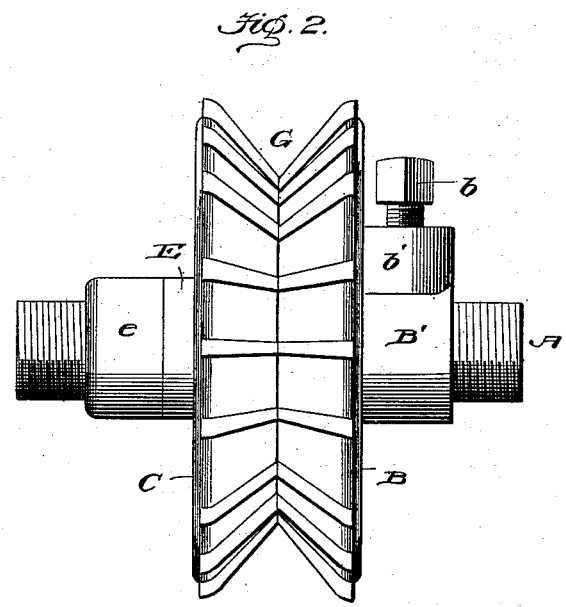
Figure 3:
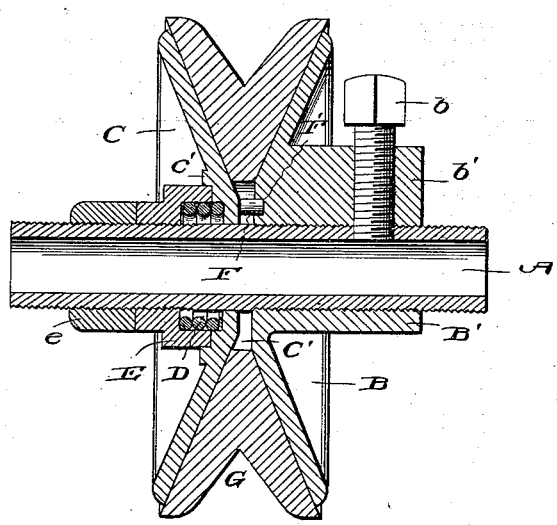
Figure 4:
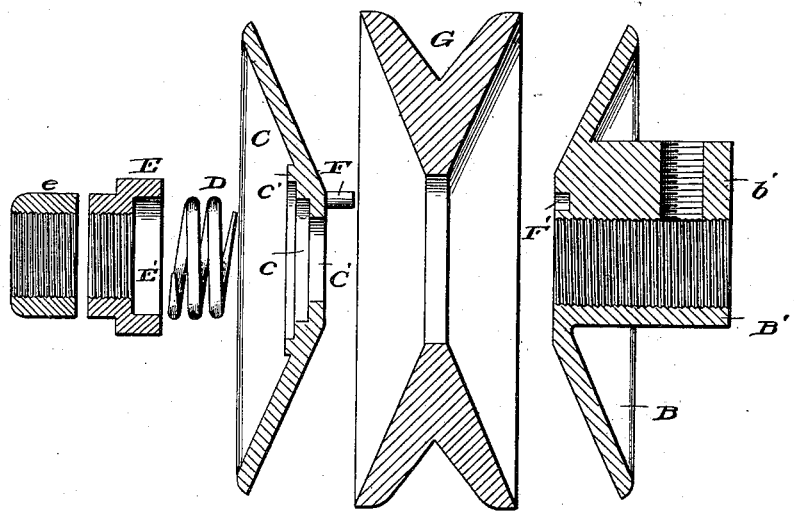

Figure 1 is a perspective view of the shoe applied to a brake-arm. Fig. 2 is a front elevation thereof. Fig. 3 is a central vertical transverse section. Fig. 4 is a detail view of the parts detached.

Referring to said figures by letters of reference, A is the axle, threaded as shown, and mounted upon one end thereof is the stem B' of a frusto-conical disk B, secured thereto, preferably, by means of a set-screw $b$, passing through a thickened portion $b'$ of said stem. Loosely mounted upon the opposite end of axle A is a second frusto-conical disk C, said disk being provided on its outer or concave face, about the passage C' therein, with a countersink $c$, adapted to receive one end portion of a coiled spring D, mounted upon the axle A and extending into a recess E' within the inner end of a nut E. This nut is threaded upon the axle A and is adapted to be adjusted in relation to the disk C, thereby regulating the tension of the spring D. A ridge or bead $c'$ is formed on the outer face of the disk C, which is adapted to compass the inner edge of the nut E when screwed into proper position, thereby serving to prevent displacement of said disk. If desired, a nut-lock, as $e$, may be employed. Upon the inner surface of disk C, near the passage C' therein, is formed a pin F, adapted to engage with a recess F', formed in the inner surface of disk B, whereby radial movement of the disk C is prevented except with the disk B and the axle. Intermediate the inwardly-tapered disks and bearing upon the surfaces thereof is mounted the rim G, preferably constructed upon its outer surface, as shown. This rim is loosely mounted on the disks and supported thereby.

When the brake-shoe is applied to a tire, the motion of the wheel will cause the rim G to revolve upon its cone-bearings—*i. e.*, the inner surfaces of the disks B and C. This motion will generate and increase friction between the rim and the disks as pressure is exerted upon the shoe, causing the rim to bear down like a wedge upon the disks.

It is obvious that the spring D will retain the disks firmly clamped against the rim at all times and that the pressure thereof may be regulated at will by adjusting the nut E.

Although I have described my invention as especially applicable for use upon rubber tires, it can be used with equal effectiveness upon metal tires by placing rubber or other suitable material upon the rim G.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim, and desire to secure by Letters Patent, is—

1. In a brake-shoe, the combination of an axle, a disk secured thereto, a second disk loosely mounted on the axle and engaging with the opposite disk, and a rim mounted on said disks, substantially as described.

2. In a brake-shoe, the combination of an axle, a disk secured thereto, and having a recess therein, a second disk loosely mounted on the axle, a pin thereon adapted to engage with said recess, a rim mounted upon the disks and means for binding the disks upon the rim, substantially as described.

3. In a brake-shoe, the combination of an axle, a disk secured thereto, a second disk loosely mounted thereon and engaging with the opposite disk a rim mounted upon the disks and means for automatically taking up wear upon the rim and disks, substantially as described.

4. In a brake-shoe, the combination of an axle, a disk secured thereto, a second disk loosely mounted thereon, and engaging with the opposite disk, a nut adjustably mounted upon the shaft and having a recess therein, a spring within the recess adapted to bear upon said second disk, and a rim, substantially as described.

5. In a brake-shoe, the combination of an axle, a disk secured thereto, a second disk loosely mounted thereon and engaging with the opposite disk, a rim loosely mounted on the disks and provided with transversely-extending ridges, and means for automatically taking up the wear upon the rim and disks, substantially as described.

6. In a brake-shoe, the combination of a rim, and friction-cones adapted to bear upon the sides of said rim, substantially as described.

7. In a brake-shoe, the combination of the axle, a disk secured thereto, a second disk loosely mounted thereon, a rim clamped between said disks, a nut for regulating the pressure of the disks upon the rim, and means for locking the disks together, substantially as described.

8. In a brake-shoe, the combination of the axle, a disk secured thereto, a second disk loosely mounted thereon, a rim clamped between said disks and bearing upon the surfaces thereof, a spring mounted upon the axle and bearing upon the loosely-mounted disk, a nut for regulating the pressure of said disks upon the rim and means for locking said disks together.

In testimony whereof I affix my signature in presence of two witnesses.

LORIN E. HALE.

Witnesses:
LOUIS ROBIDOUX,
JAMES G. YOUNG.